Figure 1:
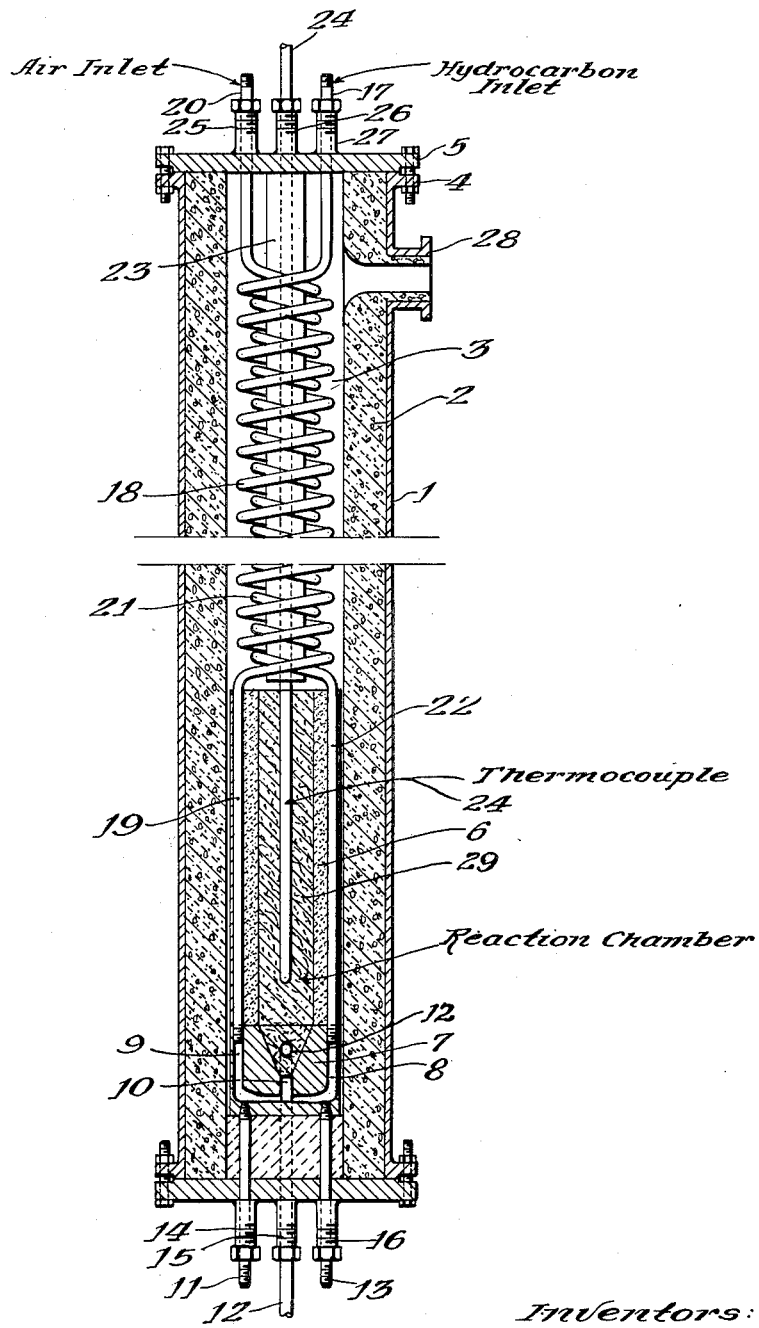

Dec. 23, 1952  R. M. DEANESLY ET AL  2,622,969
RECUPERATIVE AUTOTHERMIC REACTOR
Filed Dec. 24, 1947  2 SHEETS—SHEET 1

Inventors:
Richard M. Deanesly
Charles H. Watkins
By: Maynard P. Venema
Attorney:
Philip T. Liggett
Agent:

Inventors:
Richard M. Deanesly
Charles H. Watkins
By Maynard P. Venema
Attorney
Philip T. Liggett
Agent Patented Dec. 23, 1952

2,622,969

UNITED STATES PATENT OFFICE 2,622,969

RECUPERATIVE AUTOTHERMIC REACTOR

Richard M. Deanesly, Hinsdale, and Charles H. Watkins, Brookfield, Ill., assignors to Universal Oil Products Company, Chicago, Ill., a corporation of Delaware Application December 24, 1947, Serial No. 793,751

3 Claims. (Cl. 23—284)

This invention relates to an improved recuperative type of reactor which is particularly adapted to effect the oxidative or autothermic cracking of hydrocarbons for the production of olefins.

The demand for low molecular weight olefins, particularly ethylene, for use in the synthesis of organic chemicals is increasing with the expansion of the petro-chemical industry. Ethylene has been obtained up to the present time primarily from the gases produced from the thermal and catalytic cracking and reforming of hydrocarbons.

The apparatus of the present invention provides means for supplementing this supply with the production of olefins by the pyrolysis of hydrocarbons. The oxidative cracking of paraffins such as ethane, propane and butane to produce olefins has been known and experimented with for some time. However, the results have not been particularly attractive in that the yields have been rather low and variable. The low and variable yields have been principally due to improperly controlled operating conditions, as well as inefficient types of apparatus.

Improved processing procedure and improved apparatus, particularly in regard to effecting preheating, adequate mixing of the hydrocarbon and oxygen containing streams, and means for carrying out the reaction under substantially adiabatic conditions, have led to increased production of ethylene. The apparatus of this invention, as will be pointed out more fully hereinafter, makes possible the operation of an autothermic cracking process in a very efficient manner.

Briefly, the recuperative autothermic reactor of this invention comprises, a tubular reaction section of heat resistant material, a mixing section at one end thereof having reactant stream inlet ports which are restricted in area and positioned in a manner to provide the discharge of a mixed and high velocity stream into the reaction section, additional flow mixing means within the reaction section, an elongated gas passageway in open communication with the outlet end of the reaction section, suitable tubular units, baffling, or other stream conducting means positioned within the passageway in a manner to separately accommodate reactant streams charged thereto and conduct them in heat exchange relationship with the reaction products from the reaction section, insulated and pressure tight housing means enclosing both the reaction section and the gas passageway, insulated means conducting the recuperatively heated reactant streams from the heat exchange passageway to the inlet ports of the mixing section, and means for discharging the resulting product stream from the heat exchange passageway.

In a small simplified embodiment of this improved recuperative type of reactor, the heat exchange piping for each of the reactant streams may be formed into helical coils with one coil being placed inside the other, and the recuperative heat exchange passageway is arranged to be coextensive with the elongated reaction tube such that one long insulated housing can enclose the various portions of the improved reactor. However, the arrangement of the preheating section with respect to the reaction section is not to be limited to but one form of construction, for as will be pointed out more fully hereinafter, the preheating or recuperative section, may be arranged in various manners with respect to the outlet of the reaction section, and the conduits or tubular units accommodating the reactant streams may be constructed in various forms and arrangements within the recuperative passageway.

One of the principal objects and advantages of the combined unit of this invention is of course to provide an autothermic reactor suitable for effecting a substantially adiabatic process, as well as providing an efficient heat exchange means, in combination therewith, for the preheating of the reactant streams.

The reaction tube of the apparatus is especially designed to carry out the autothermic or oxidative cracking conversion process under substantially adiabetic conditions so that higher yields of the desired product may be obtained therefrom. The tubular reaction chamber is preferably constructed in a manner to have a length equal to at least 5 times that of the inside diameter of the tube, so that the desired reaction may be entirely completed within the reaction zone. The reaction tube is necessarily made of a heat resisting material and is adequately insulated on the exterior thereof to aid in effecting an adiabatic conversion process. The mixing section to the reaction tube is constructed to provide a complete homogeneous mixing of the reactant streams prior to their introduction to and their partial oxidation within the reaction space. The intake ports or jets of the mixing section are of small diameter or have orifice type of restrictions, so that each will provide a high velocity flow therethrough to a mixing throat. The throat may in turn have further baffling or flow restricting means to provide adequate mixing and a high velocity discharge into the reaction zone. The reaction zone itself is provided with baffling, or preferably packing, throughout its entire length so as to provide a high degree of turbulence to the reactants during their passage through that zone. In general, two types of reactions take place simultaneously within the reaction zone. A portion of the hydrocarbon stream combines with the oxygen containing stream in an exothermic reaction to provide heat which in turn is absorbed by the remaining portion of the hydrocarbon stream in an endothermic high temperature cracking reaction, so that ethylene and other low molecular weight olefins are formed therein. Thus, the packing in the reaction zone provides the necessary turbulence for mixing, as well as furnishing additional surface within the zone to provide a more efficient conversion.

By the use of properly designed coils, tube and shell arrangements, baffled passageways, or the like for charging the reactant streams through the heat recuperating zone, it is possible to eliminate additional and external preheating equipment which may otherwise be required, and at the same time provide an overall conversion operation which is more nearly adiabatic. In a preferred form of the apparatus of this invention, the preheat passageway is contiguous with the reaction tube and the heat exchange means within the preheating or recuperative section, is such as to separately conduct the reactant streams therethrough and to provide a temperature differential of less than about 300° F. between the outgoing and incoming streams where the hot stream is of the order of 1200° to 2000° F. In other words, the piping or tubular arrangement must be of a type to effect a high degree of heat transfer to the incoming reactant streams.

The accompanying drawings show simplified embodiments of recuperative autothermic reactors which combine the improved features of this type of apparatus, however, it should be understood that this invention is not limited to the specific embodiments shown.

Figure 1 of the drawing is a sectional elevational view of a recuperative autothermic reactor.

Figure 2:
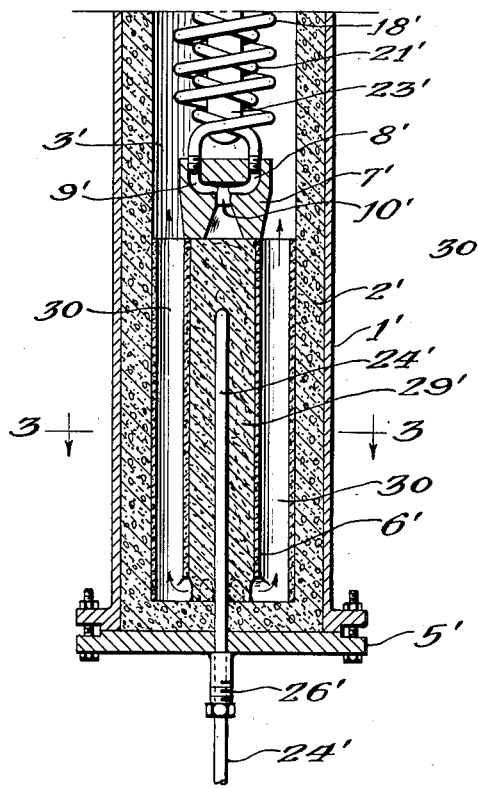

Figure 2 of the drawing is a sectional elevational view of a reactor which has the construction and arrangement of the lower portion thereof somewhat different from that of the embodiment shown in Figure 1.

Figure 3:
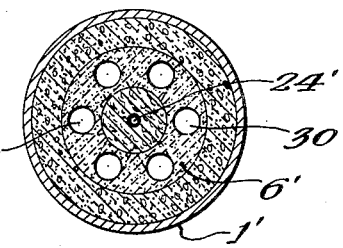

Figure 3 is a sectional plan view through the lower portion of the alternate reactor chamber of Figure 2, as indicated by the line 3—3.

Referring now to Figure 1 of the drawing, there is shown an elongated housing 1, having internal insulation 2, which in turn forms an open, longitudinal passageway 3 extending through one end of the housing. Suitable flanges 4 and covers 5 are provided at each end of the housing to form a pressure tight unit. Each of the covers 5 may be suitably bolted to the flanges of the housing so that they are removable and the internal portion of the chamber thereby rendered accessible for inspection and repair work.

In the interior of the housing 1, at one end of the passageway 3, there is positioned an elongated reaction tube 6, which is formed of a refractory material, suitable for accommodating temperatures of the order of 1000° to 2500° F. The tube is preferably cylindrical in shape with a length equal to ten times the inside diameter thereof. Also, a temperature resistant packing 29 is placed within this reaction tube to provide additional heating surface and a turbulent mixing type of contact between the reactant streams as they pass therethrough. At the inlet end of the reaction tube 6, directly connective therewith, is a mixing assembly 7 having two small diameter inlet ports, 8 and 9, suitably arranged to receive preheated reactant streams which are conducted from the gas passageway 3. In the embodiment shown, the inlet ports 8 and 9 enter the top of the mixer 7 and turn at right angles to oppose one another at the center of the unit, and to discharge into a small mixing throat 10, which in turn discharges through a flared opening in the top of the mixer and to the inlet end of the reaction tube.

The mixing ports and throat are of small diameter and restricted as may be necessary to provide turbulence and a high velocity to the streams as they pass therethrough, so that complete mixing of the reactants is accomplished prior to their being discharged to the reaction zone.

In this embodiment of the improved reactor, there are shown three conduits or passageways communicative with the mixing section at that end of the housing. These conduits 11, 12 and 13 extend through the lower cover 5 of the unit and terminate within the mixer 7. The conduits 11 and 13 are communicative with the inlet ports 9 and 8 respectively, and may be used during the operation of the unit to provide control connections. For example, thermocouples installed within these conduits 11 and 13 will provide a check on the temperature of each of the reactant streams being introduced through the ports 8 and 9 to the reaction zone. The conduit 12 terminates in the enlarged flared portion of the mixer and may be used to good advantage in starting up the apparatus. For example, a hot gas may be passed therethrough to the reaction chamber to preheat the entire apparatus, prior to starting up, or alternatively a very high temperature stream, such as superheated steam, may be charged therethrough in starting up the unit to provide means for igniting the reactant streams. It also may be found necessary to provide a certain amount of secondary air for obtaining the proper ignition and starting up conditions for the autothermic conversion process in which case secondary air may be introduced therethrough. Suitable packing glands 14, 15 and 16 are provided for each of the conduits 11, 12 and 13 respectively so that a superatmospheric pressure may be maintained within the interior of the housing.

The outlet end of the reaction tube 6 is unrestricted and discharges into the interior of the insulated zone or passageway 3. This portion of the unit may be designated as the preheating section, or recuperative heat exchange zone, through which the reactant streams are separately conducted to become preheated prior to their introduction to the reaction zone. In the embodiment shown, assuming the unit is being used for ethylene production, the hydrocarbon stream is introduced through the conduit 17 and passes through the outer helical coil 18 to a straight insulated conduit 19, which in turn introduces the resulting heated material to the inlet port 9 of the mixing section. The oxygen or air stream is introduced through a conduit 20 and passes through the inner helical coil 21 of the heat exchange zone 3, and subsequently passes through the straight insulated conduit 22 to the inlet port 8 of the mixing section.

Also in this embodiment, a high temperature resistant member 23 is positioned longitudinally within the helical coils to increase the velocity of gas flow over the outside of the helical coils. The member 23, like the reaction tube 6, is of a high temperature resistant material such as porcelain, quartzite, carborundum, or the like. Passing through the member 23 and down into the interior of the reaction chamber 6 is a thermowell 24, suitable to accommodate a thermocouple or other temperature recording means. A thermocouple is desirable to provide means of measuring the reaction temperature and to thereby provide means for controlling the process as may be desired.

In a manner similar to the pressure retaining means provided at the mixing end of the apparatus, suitable packing glands 25, 26 and 27 are provided around each of the inlet conduits 20, 24 and 17 respectively so that a pressure tight seal is made at the chamber cover 5.

The resulting pyrolysis products, subsequent to their discharge from the reactor tube 6 and their passage through the recuperative zone 3, are removed from the apparatus by way of the outlet 28, which in this embodiment is positioned in the side of the chamber 1, near one end thereof.

In the operation of this recuperative type of reactor, the entire preheating of the reactant streams is accomplished within the contiguous heat exchange section, so that the reactant streams enter the mixing portion of the reaction section at a temperature suitable to carry out an efficient oxidative cracking reaction. In accomplishing adequate heat exchange between the outgoing hot gases and the incoming reactant stream, there must be an adequate length of tubing or piping provided for each of the streams within the preheating chamber, a proper choice of materials, and a proper arrangement of the coils with respect to the passageway, so that a highly efficient heat exchange is effected therein. It is also a provision of this improved apparatus, that the means conducting the preheated streams to the reaction chamber, or more specifically, that the conduits 19 and 22, are properly insulated so that there is no cooling of the preheated streams, and any tendency to draw heat from the reaction chamber as the streams are conducted around the chamber to the inlet end thereof is minimized.

Embodiments other than the straight elongated unit of this drawing are contemplated within the scope of this invention, and it is not intended to unduly limit the apparatus to one specific form. For example, an L-shaped arrangement may be made between the reaction section and the preheating section, with the outlet of the reaction tube being directly and closely communicative with the inlet end of the preheating zone. The tube coils or tube banks which accommodate the reactant streams during their passage through the recuperating section may, as noted hereinabove, be of other than a helical form. Conventional tube coils or tube bundles as used in a shell and tube type of heat exchanger, or alternatively, a plurality of tubes in a parallel arrangement with suitable inlet and outlet headers, may be used for preheating the reactant streams. The reaction tube and preheat sections of a unit may be positioned either vertically or horizontally, with the general arrangement of sections being dependent on construction requirements of the unit, or overall plant requirements. It is also a feature of the present invention that the conduit means, carrying the preheated reactants to the inlet end of the reaction tube be adequately insulated to prevent a heat loss therefrom, and be as short as possible.

Referring now to the alternate form of the recuperative type of reactor as shown in Figures 2 and 3 of the drawing, there is shown only the lower portion of the unit, since the upper portion of this embodiment is substantially the same as that illustrated in Figure 1. The elongated housing 1' has internal insulation 2' surrounding the passageway 3' and the tubular reaction section 6'. As in the previously described embodiment, there is an outer helical coil 18' and an inner helical coil 21' within the passageway 3' which transfer respectively the hydrocarbon and oxygen-containing streams through the upper preheating section. The principal difference between this latter embodiment and that of Figure 1 resides in the construction and arrangement of the tubular reaction section 6' and the positioning of the mixing section 7' above the reaction zone, so that the recuperatively heated reactant streams connect directly to the mixing section, the long insulated conduits used to carry the streams from the heating coils to the mixing section being eliminated. The preheating coil 18' connects directly with the inlet port 9' of the mixer 7', and the coil 21' connects directly with the inlet port 8'. The inlet ports 8' and 9' of the mixer 7', as before, turn and intersect with one another at the small mixing throat 10', which in turn discharges through a flared opening directly into the inner channel of the reaction section 6'.

The reaction section 6' is a specially constructed tubular member of a heat resistant material having channeling means therein to reverse the direction of the flow stream. In this embodiment reaction section 6' has relatively large central opening or channel and a plurality of smaller channels or tubular openings 30 which surround the inner one and connect with it through suitable slots at the lower end of the unit. Thus, the flow of the mixed reactant stream is downward from the mixing section 7' through the central channel of the reaction section 6' to the lower end thereof and upward through the plurality of outer channels 30 and into the passageway 3' of the heat recuperating zone. As may be noted in Figure 3 of the drawing, there are six passageways 30 shown in this particular embodiment, however, it is not intended to limit the apparatus to any particular shape or set number of outer passageways for accommodating the reverse flow of the reaction stream and resulting reaction products. A packing material, such as heat resisting porcelain Raschig rings 29', may be placed within the inner channel of the reaction zone, or alternatively, suitable baffling may be constructed therein to provide a turbulent mixing type of contact between the reactant stream and the oxidation products as they pass downwardly through this inner zone. Although not shown in this drawing, additional packing or baffling may be placed within each of the outer channels 30, and the design of the reaction section may be such as to have the autothermic cracking reaction continue therein as the streams flow upwardly to the top of the tubular section 6'.

A thermowell 24' is provided within the packed bed 29' in the inner zone of the reaction section 6' and in this embodiment the thermowell 24' passes upwardly through the housing cover 5' and the lower portion of the insulation 2'. A suitable sleeve and packing gland 26' is provided at the cover 5' so that a pressure tight seal is effected around the thermowell. Although not shown in Figure 2, additional thermowells may be provided to the interior of the apparatus to accommodate additional thermocouples for indicating stream temperatures at critical points, and for providing thereby an improved overall control of the autothermic cracking operation.

In a preferred design, as indicated in either Figures 1 or 2 of the drawings, the inlet ports of the mixing section are a Venturi shape or are otherwise restricted to provide high velocity mixing prior to discharge into the reactor section itself. The mixing throat is preferably narrow and of relatively small volume, being of the order of less than one one-hundredth of the volume of the reaction zone itself. The main body of the reaction section is provided with high temperature resistant packing, such as porcelain Raschig rings, to insure homogeneous turbulent reaction conditions. It is a further provision of this improved autothermic reactor apparatus, that the materials of construction within the reaction zone be substantially iron-free in order that the conversion reaction is not catalyzed to cause the formation and deposition of carbon therein.

Alternate arrangements of the various thermocouple and control connections may be made in other modified forms of the unit, for it is obvious, that connections of this type may be made to the apparatus in alternate ways without impairing the efficiency and the compact arrangement of the recuperative reactor of this invention. The apparatus, however, should be constructed to operate under a substantially superatmospheric pressure and therefore should have suitable pressure tight access openings and pressure retaining sleeves around all inlet and outlet conduits which communicate with the interior of the chamber. It is still further contemplated that devices and instruments, other than those which have been shown and mentioned, may be provided for in a commercial unit. For example, it is possible that a spark coil, or glow coil, be deemed desirable and positioned within the reaction chamber in order to provide means for igniting the reactant streams upon starting up the oxidative cracking process.

Recuperative reactors of this type may be used alone or in banks which comprise a plurality of single units. In a large commercial plant it may be found economically desirable to employ a plurality of optimum sized units rather than a single large type of chamber.

In summary, the design features of this invention, providing for the efficient conduct of the autothermic cracking of hydrocarbon gases or vapors in admixture with oxygen or oxygen-containing gas, comprise, first, heat exchange units of high thermal transfer efficiency exchanging heat directly between the product gas stream from the reactor and the separate feed streams of hydrocarbon and air, or oxygen, or other oxygen-containing gas; second, a mixing zone having a small volume compared with that of the reaction zone, whereby the streams of preheated hydrocarbon and oxygen-containing gas are mixed to substantially complete homogeneity before entering the reaction zone; third, a reaction zone which is of iron-free construction and is shaped, or packed with refractory, so as to maintain a high degree of turbulence of the reacting gases; and fourth, thermal insulation around the reaction zone that is the maximum practical to prevent loss of heat to the outside or to the mixer section, or to the conduits leading from the heat exchange section to the mixer.

We claim as our invention:

1. An improved recuperative type of reactor which comprises in combination, a tubular heat resistant and insulated reaction chamber, said reaction chamber having a single relatively large axially positioned inner tube and a plurality of smaller outer tubes spaced around said inner tube, open ports connecting said outer tubes with said inner tube at one end of the reaction chamber whereby to reverse the flow of the reaction stream, an elongated gas passageway in unrestricted communication with said outer tubes of said reaction chamber and extending in axial alignment with said chamber, a mixing chamber positioned within said gas passageway adjacent to and connecting with the end of said inner tube opposite the end having said open ports to said outer tubes, reactant stream inlet ports discharging in opposing manner into a restricted mixing throat in said mixing chamber, said throat being of restricted diameter and of small volume and communicating with a flared opening discharging into said reaction chamber, an insulated pressure-tight housing enclosing said reaction and mixing chambers and said gas passageway, tubular heat exchange units extending through said elongated gas passageway and separately connecting to said inlet ports of said mixing chamber, inlet means extending through said housing and connecting to said tubular heat exchange units suitable for introducing said reactant streams thereto, and outlet means through said housing from said gas passageway.

2. The apparatus of claim 1 further characterized in that said inner tube of said reaction chamber has positioned therein a packing material comprising an iron-free high temperature resistant refractory material, said inlet ports to said mixing chamber and connecting with said throat in an opposing manner are restricted and thereby provide high velocity streams to said mixing throat for substantially instantaneously and homogeneously mixing said reactant streams.

3. The apparatus of claim 2 further characterized in that said small volume mixing throat connecting to said inner tube of said reaction chamber is very small with respect to said reaction chamber and has a volume less than one one-hundredth of that of said inner tube.

RICHARD M. DEANESLY.
CHARLES H. WATKINS.

REFERENCES CITED

The following references are of record in the file of this patent:

UNITED STATES PATENTS

| Number | Name | Date |
|---|---|---|
| 1,839,738 | Casale | Jan. 5, 1932 |
| 1,943,580 | Brown | Jan. 16, 1934 |
| 2,319,508 | Leprestre | May 18, 1943 |